United States Patent [19]

Georges et al.

[11] Patent Number: 5,274,057
[45] Date of Patent: Dec. 28, 1993

[54] BEAD SUSPENSION POLYMERIZATION PROCESS

[75] Inventors: Michael K. Georges, Guelph, Canada; Robert D. Bayley, Fairport, N.Y.; Lupu Alexandru, Toronto, Canada

[73] Assignee: Xerox Corporation, Stamford, Conn.

[21] Appl. No.: 812,082

[22] Filed: Dec. 23, 1991

[51] Int. Cl.$^5$ .............................................. C08F 2/20
[52] U.S. Cl. .................................... 526/202; 526/237; 524/459; 525/59
[58] Field of Search ............... 526/237, 202; 524/459; 525/59

[56] References Cited

U.S. PATENT DOCUMENTS

| | | | |
|---|---|---|---|
| 3,183,208 | 5/1965 | Jurgeleit | 260/41 |
| 4,002,812 | 1/1977 | Hendy | 526/87 |
| 4,330,460 | 5/1982 | Hoffend et al. | 526/237 |
| 4,415,644 | 11/1983 | Tamaki et al. | 430/109 |
| 4,558,108 | 12/1985 | Alexandru | 526/340 |
| 4,601,968 | 7/1986 | Hyosu | 430/137 |
| 4,609,607 | 9/1986 | Takagi et al. | 430/106.6 |

Primary Examiner—Joseph L. Schofer
Assistant Examiner—David Wu
Attorney, Agent, or Firm—E. O. Palazzo

[57] ABSTRACT

An improved process for producing resin particles by a bead suspension polymerization reaction, and a polymer formed by the process wherein the process comprises: providing a liquid reaction medium suitable for conducting the polymerization; forming a suspension agent system in the reaction medium by an in situ interaction of at least two components in the reaction medium, for example, certain water soluble metal halides and polyvinylacetate derived polymers; adding at least one polymerizable monomer compound to the resulting reaction medium having the suspension agent system dispersed therein; and effecting polymerization of the monomer in the reaction medium to form low ash content beads of the polymer.

A second embodiment comprises conducting a bead suspension polymerization process utilizing the suspension agent system formed in situ to limit the amount of fine particles of less than about 100 microns produced during the process comprising: providing a reaction medium suitable for conducting the polymerization in the reaction system; utilizing a suspension agent system which is appropriate for forming polymer beads having a desired size and for minimizing fine particle formation; adding at least one polymerizable monomer compound to the resulting reaction medium having the suspension agent system dispersed therein; effecting polymerization of the monomer in the reaction medium to form the beads of the polymer; and separating resin particles from the reaction followed by optional washing and drying.

9 Claims, No Drawings

BEAD SUSPENSION POLYMERIZATION PROCESS

BACKGROUND OF THE INVENTION

The present invention relates to processes for the preparation of polymers, and more specifically to a bead suspension polymerization and to the polymer formed thereby. In one embodiment, the present invention relates to a suspension polymerization process for producing low ash content polymer beads, that is polymer beads containing low or no residual inorganic contaminants, from at least one monomer comprising providing a reaction medium suitable for conducting said polymerization; forming a suspension agent system in said reaction medium by in situ interaction of at least two components in said reaction medium, for example a metal halide salt and a polar polymer; adding at least one polymerizable monomer compound to the resulting reaction medium having the suspension agent system dispersed therein; and effecting polymerization of the monomer or monomers in the reaction medium to form beads of said polymer. The polymer resin beads produced by the process of the present invention in embodiments are essentially free of inorganic residuals, that is the product contains less than about 100 parts per million of noncombustible inorganic ash residue.

It is known to form resins by bead suspension polymerization. It is also known that suspension agents can be used to stabilize a dispersion of a polymerizable material. A wide variety of suspension agents have been disclosed in the prior art, such as polyvinyl alcohol, gelatin, methyl cellulose, methylhydroxypropyl cellulose, ethyl cellulose, sodium salts of carboxymethylpolyacrylic acid and salts thereof, starch, gum, alginic acid salts, zein, casein, tricalcium phosphate, talc, barium sulfate, bentonite, aluminum hydroxide, ferric hydroxide, titanium hydroxide and thorium hydroxide, reference for example U.S. Pat. Nos. 4,601,968 and 4,609,607, the disclosures of which are totally incorporated herein by reference.

Another method known in the art for forming a suspension involves dispersing a monomer system comprising a polymerizable organic monomer and a polar polymer in a dispersion medium containing a dispersant having a charging polarity opposite to that of the polar polymer. Such a method is disclosed in U.S. Pat. No. 4,592,990.

U.S. Pat. No. 4,659,641 also discloses a process wherein a suspension agent such as tricalcium phosphate is selected to stabilize the mixture. A relatively large amount, about 3 weight percent of total monomer used, of this suspension agent is required.

In a patentability search report the following patents were recited:

U.S. Pat. No. 4,415,644 to Tamaki et al., issued Nov. 15, 1983, discloses a suspension polymerization process employing certain salts, including potassium and sodium iodide as an emulsification-preventing agent, see for example column 3, lines 5 to 11.

U.S. Pat. No. 4,330,460 to Hoffend et al., issued May 18, 1982, discloses a dispersion polymerization process for producing colored toners comprising mixing a colorant with a monomer to form an oil soluble organic phase, mixing the organic phase with an aqueous phase containing a suspending agent and an inorganic salt to form a suspension and thereafter polymerizing the mixture to form colored particles in the range of about 1 to 100 microns, see for example column 4, lines 46 to 55.

In the processes of the prior art, various significant problems exist, for example difficulties in predicting or controlling the bead size of the polymers produced by the reaction are encountered. Moreover, the reactions often produced polymeric fouling, that is undesirable deposits of polymer on the agitator, baffles, heating coils and reactor walls. In some situations, the suspension would coalesce during the reaction. This produced large deposits of undesirable polymeric material which were difficult, expensive and hazardous to remove from the reactor.

Further, polymeric fouling or gel body formation may result in a broad particle size distribution, for example from about 1 to about 500 microns; a large quantity of fines, for example, 20 weight percent of the product beads, that is small size bead particles of less than 100 microns in diameter; and/or difficulties encountered during filtering, and drying and manipulating the product resin beads.

Another problem associated with the prior art suspension agents, such as tricalcium phosphate, used in bead suspension polymerizations is that an additional aqueous acid washing step or steps may be required to remove the residual inorganic salts from the surface of the beads. In certain instances, if the acid washing step is omitted, the performance of the polymer resin in a product application, for example in an electrophotographic toner composition, may be adversely affected, for example in triboelectrification charge properties and melt rheology properties. The aqueous solution of the tricalcium phosphate and acid must subsequently be disposed of requiring an additional processing cost.

These and other disadvantages are avoided, or minimized with the processes of the present invention.

Thus, there remains a need for processes for the preparation of polymeric resin beads by suspension polymerization techniques and which polymers retain many or all of their desirable physical properties, for example hardness, processability, clarity, high gloss durability, and the like, while avoiding the problems of gel formation, purification and performance of the polymer resin bead product associated with the prior art suspension polymerization methodology.

SUMMARY OF THE INVENTION

A feature of the present invention overcomes the problems and disadvantages of the prior art by forming a suspension agent system by means, for example, of an in situ interaction of polyvinyl alcohol/acetate and an alkali metal salt at the interface of monomer droplets or incipient resin beads within the reaction medium. The in situ interaction produces a suspension agent system that forms resin particle beads of large size, for example from about 50 to 600 micrometers, and having a smaller amount of undesirable fine particles, for example less than about 0.3 weight percent of the polymer product, as compared to a reaction using only polyvinyl alcohol/acetate as the suspending agent that produces, for example, about 2 to about 10 weight percent of fines of the polymer product. As a result, much smaller amounts of suspension agent may be successfully employed, for example from about 0.01 to about 1.0 weight percent. By contrast, the prior art methods require excess suspension agent to be used. This results in the production of ash, that is the presence of the aforementioned residual inorganic suspension agent salts, in the polymer product. In some instances, the ash is believed to chemically interact with certain charge control agents in toner formulations, thereby causing poor aging stability. Resins prepared in accordance with the processes of the present invention have substantially no detectable ash from inorganic salts and are essentially free of residual polyvinyl alcohol/acetate (PVOH/PVOAc) stabilizing polymers. Thus, the polymers obtained with the processes of the present invention provide for a toner which is free of the suspension stabilizing components and is remarkably stable when formulated into, for example, toner compositions whose product performance may be significantly impacted by trace impurities.

The process of the present invention comprises a suspension polymerization process for producing low ash content polymer beads from at least one monomer, said process comprising providing a reaction medium suitable for conducting the polymerization, for example water; adding a surfactant to the reaction medium in an amount of about 0.01 to about 0.10 percent by weight of the total monomer; forming a suspension agent system in the reaction medium by in situ interaction of a partially hydrolyzed polyvinyl acetate polyvinyl alcohol polymer as the suspending agent in an amount of about 0.01 to about 0.10 percent by weight of the total monomer, and potassium iodide in an amount of about 0.01 to about 0.10 percent by weight of the total monomer; adding at least one polymerizable monomer compound in an amount of about 85 to 100 percent by weight relative to the total of other additives to the resulting reaction medium having the suspension agent system dispersed therein; effecting polymerization of the monomer or monomers in the reaction medium to prevent the formation of a crosslinked insoluble shell on the surface of the bead thereby minimizing fine particle formation; and optionally washing and drying to isolate the polymer resin beads. The present invention provides several specific advantages in embodiments as follows. Since the process of the present invention utilizes a smaller amount of a suspension agent, a smaller amount of suspension agent is incorporated in the polymer formed by this process and a superior product is therefore formed. Moreover, in accordance with a feature of the present invention, the suspension agent is formed by an in situ interaction; that is a partially hydrolyzed polyvinyl acetate polymer and an alkali halide salt interact at the interface of the monomer bead or droplet and the aqueous phase. Although not desired to be limited by theory, the aforementioned interaction is believed to vary the stabilizing effect and extent of the polyvinyl alcohol/acetate (PVOH/PVOAc) stabilizing polymers and therefore, allows for control of bead size formation and monomer droplet size distribution. In the presence of the alkali salts, insoluble shells that form on the surface of the resin beads and are comprised of PVOH/PVOAc and resin polymer crosslinked together are avoided. Further, in embodiments only certain alkali halide salts are effective in modifying the stabilizing properties of the PVOH/PVOAc stabilizer polymers. Thus, sodium iodide was more effective than potassium iodide in its ability to alter the stabilizing effectiveness of PVOH/PVOAc polymers, whereas sodium chloride had substantially, no effect on the stabilizing properties of PVOH/PVOAc polymers. A Russian publication by A.A Abramzon et al., *Kolloidnyi Zhurnal*, 31, 3 (1969), discusses the salting out effect of partially acrylated poly(vinyl alcohol) by various salts and demonstrated the effect this has on the life time of styrene droplets dispersed in the medium. One of the conclusions ws that the styrene droplets are more stable at some poly(vinyl alcohol)/salt mixture as a result of the precipitating out of the poly(vinyl alcohol) onto the surface of the styrene droplet. This research focused on using sulfate and iron salts.

The above, other objects and many of the advantages of the present invention can be accomplished by the provision of processes which comprise in embodiments thereof a suspension polymerization process for producing low ash content polymer resin beads from at least one monomer, said process comprising providing a reaction medium suitable for conducting said polymerization; forming a suspension agent system in said reaction medium by in situ interaction of at least two components in said reaction medium; adding at least one polymerizable monomer compound to the resulting reaction medium having said suspension agent system dispersed therein; and effecting polymerization of said monomer compound in said reaction medium to form beads of said polymer.

One embodiment comprises a suspension polymerization process for producing polymer beads comprising providing an aqueous reaction medium; adding a surfactant to said reaction medium; forming a suspension agent system in said aqueous reaction medium by in situ interaction of at least two components in said aqueous reaction medium; adding styrene and butadiene to said aqueous reaction medium having said suspension agent system dispersed therein; and effecting polymerization of said styrene and said butadiene to form beads of said polymer.

Another embodiment comprises a suspension polymerization process for producing a low ash content polymer beads from at least one monomer, said process comprising providing a reaction medium suitable for conducting said polymerization; adding a surfactant to said reaction medium; forming a suspension agent system in said reaction medium by in situ interaction of partially hydrolyzed polyvinyl acetate poly(vinyl alcohol), a polymer and potassium iodide in said reaction medium; adding at least one polymerizable monomer compound to the resulting reaction medium having said suspension agent system dispersed therein; effecting polymerization of said monomer in said reaction medium to prevent the formation of a crosslinked insoluble shell on the surface of said bead thereby minimizing fine particle formation; and optionally washing and drying to isolate said beads.

With the process of the present invention, polymer product bead sizes can be varied from between approximately 200 microns to approximately 600 microns by varying the alkali halide salt concentration. When the suspension polymerization process conditions of the present invention are attempted without using the alkali halide salt, the surface of the resin beads are observed to form shells. The shells are comprised of PVOH/PVOAc crosslinked in combination with the polymer resin product leading to the formation of undesirable gel bodies that are responsible for changing physical properties, such as solubility and rheology, of the product resins. Since the suspension agent system is formed in situ and is believed to remain entirely in the aqueous phase after the product resin beads have been separated, the need for employing an aqueous acid rinse of the resin beads to remove inorganic salts, such as tricalcium phosphate, from the surface of the beads, as disclosed in the prior art, is avoided. Environmental problems related to the handling and disposal of acid washings are thereby entirely avoided.

During the polymerization of the monomer or monomers to form particles beads, the reaction time may be varied over about 1 and 6 hours, preferably between about 2 and 4 hours and optimally about 3 hours. The optimal reaction time may vary depending upon the temperature, the volume and scale of the reaction, and the quantity and type of polymerization initiator selected. The temperature of the polymerization reaction may be from between 80° to about 110° C., preferably 90° to 100° C., and optimally in embodiments about 95° C. A reaction volume may be selected for any size that enables simple addition, mixing, reacting and isolation of the product resin beads. A preferred initiator for accomplishing the objectives of the instant invention are the thermally activated free radical type, for example benzoyl peroxide and TAEC [O,O-t-amyl-O-(2-ethylhexyl)monoperoxycarbonate], available from Pennwalt Corporation. The monoperoxycarbonate initiator concentration employed is typically less than one percent by weight, for example about 0.01 to 0.50 weight percent, of the total monomer to be polymerized. The very low alkali halide concentration used may be from between about 0.0001 to about 0.0010 parts by weight of the total monomer polymerized.

At the completion of the intended polymerization reaction, a finishing step can be selected to facilitate isolation and purification of the desired resin beads. The finishing step comprises additional heating at about 115° to about 130° C. for about one hour to consume residual unreacted monomer by further polymerization processes leading to product resin beads containing less than 1,400 parts per million of residual or unreacted monomer, for example styrene.

Another feature of the instant process invention is to provide polymer resin beads with a low ash content or essentially ashless upon combustion analysis. Polymer resin beads possessing an ashless composition may in embodiments thereof provide several advantages: (1) an acid washing step to remove ash producing salts, such as tricalcium phosphate, from the surface of the beads is avoided; and (2) improved performance properties such as triboelectrification, admix rates and shelf life stabilities of toner compositions are prepared from ashless resin beads. Table I that follows shows comparative physical data for copolymer resin beads prepared by various methods. The polymer resin beads of the first entry of Table I were prepared by a prior art process that employed the aforementioned tricalcium phosphate (TCP) stabilizer to accomplish the suspension polymerization. The product contained a significant ash content, 0.06 percent by weight, and required an acid washing step of the product resin beads to remove the tricalcium phosphate salt from the surface of the beads. In the second entry, as described in Example II, a control experiment was conducted wherein a suspension polymerization was conducted using polyvinyl alcohol-acetate as the suspension stabilizer but in the absence of any alkali halide salt. The product resin beads resulting from this polymerization reaction contained no detectable ash content. However, the product beads possessed a tetrahydrofuran (THF) insoluble skin, or coating on the bead surfaces, that is there was substantial crosslinking of beads to one another making this product difficult to manipulate because of scumming or fouling attributable to the crosslinked material. The crosslinking of the product resin beads impeded further purification, handling and processing of the product into a suitable toner composition. The third entry in Table I, as described in Example I, is representative of the results obtained with the suspension polymerization processes of the instant invention. In this example, the conditions employed in Table I, entry two, were used with the exception that the suspension polymerization reaction was supplemented with the addition of an alkali halide salt, potassium iodide. The resulting product resin beads were found to contain a very low ash content, about 0.0005 weight percent of the total product, with no apparent insoluble crosslinked shell material on the surface of the beads. The results for entry three also provide product resin beads possessing molecular weight properties ($M_w/M_n$), melt index and glass transition ($T_g$) properties that are comparable to the prior art tricalcium phosphate suspension polymerization process of entry one in Table I.

TABLE I

| Bead Polymerization Conditions | Comparative Data for Copolymer Resin Beads | | | | |
|---|---|---|---|---|---|
| | $M_w/M_n$ | Melt Index | Tg (°C.) | Weight % Ash | Comments |
| Prior Art - styrene-butadiene TCP suspension polymerization | 132,000/20,000 | 26–27 | 55.6 | 0.060 | required acid washing to remove TCP stabilizer, high fines content |
| styrene butadiene, polyvinyl alcohol-acetate stabilizer, no alkali halide (Example II) | 106,700/17,300 | 22.6 | 57.5 | 0.000 | THF insoluble skin on bead surfaces, crosslinked |
| styrene-butadiene, polyvinyl alcohol-acetate stabilizer, alkali halide (potassium iodide) (Example I) | 136,600/20,900 | 25.4 | 57.5 | 0.0005 | no THF insoluble skin, no crosslinking, fines content less than 0.3% by weight of product |

In an embodiment of the present invention, the process comprises providing a liquid medium suitable for conducting a polymerization; forming a suspension agent system in situ by the interaction of a suspension agent, for example poly(vinyl alcohol), and an alkali metal salt, for example potassium iodide or sodium iodide; adding one or more monomeric polymerizable compounds to the resulting reaction medium having the suspension agent system dispersed therein; and effecting polymerization of the monomer or monomers in the reaction medium to form particle beads of the polymer.

A second embodiment comprises conducting a bead suspension polymerization process utilizing a suspension agent system to limit the amount of polymeric fouling produced during the process comprising providing a reaction medium suitable for conducting the polymerization in the reaction system; utilizing the suspension agent system disclosed herein which is appropriate for forming polymer beads having a desired size and for minimizing polymeric fouling, or providing a suspension agent system disclosed herein in the reaction medium; adding at least one polymerizable compound to the resulting reaction medium having the suspension agent system dispersed therein; effecting polymerization of the monomer in the reaction medium to form the beads of the polymer; and separating resin particles from the reaction followed by optional washing and drying.

The present invention also comprises a polymer formed by processes illustrated herein and which is essentially ashless, for example, upon combustion analysis of the product resin beads, a 20 gram (+/−0.0005) sample of resin beads was weighed into a tared platinum crucible and heated in a muffle furnace for 2 to 3 hours and 5 hours at 800° C., and the residue remaining was attributed to noncombustible inorganic ash content. In the polymer resin beads of the instant invention, in embodiments only trace amounts of inorganic elements are detectable, for example calcium or phosphorous concentration is measured by inductively coupled plasma and found to be at trace or background levels. This results since the use of calcium and phosphorous containing salts was avoided using the process of the instant invention. Further, the level of alkali metal salts contributing to the ash content is very small or negligible because the alkali metal salts remain in the aqueous layer and do not contaminate the product beads to any measurable extent.

In another embodiment the present invention comprises a suspension polymerization process for the preparation of low ash content polymer resin beads from at least one monomer, said process comprising:

(a) providing a reaction medium comprising water suitable for conducting said polymerization;

(b) forming a suspension agent system in said reaction medium by in situ interaction of two components in said reaction medium, which system is comprised of an alkali metal salt, preferably potassium iodide, a hydrolyzed polyvinyl acetate component, and a polyvinyl alcohol component;

(c) adding at least one polymerizable monomer compound to the resulting reaction medium having said suspension agent system dispersed therein;

(d) effecting polymerization of said monomer compound in said reaction medium to form beads of said polymer;

(e) removing said reaction medium by known means like filtration; and (f) optionally washing and drying to isolate the polymer bead products.

The processes of the present invention can be selected to form a wide variety of polymers. For example, it can be used to polymerize a styrene monomer to form polystyrene. It may also be selected to polymerize acrylates to form polymers such as polymethylmethacrylate. Also, the process of the present invention can be selected to polymerize a mixture of two or more polymerizable monomers to form copolymers therefrom. In an embodiment of the present invention, polyvinyl alcohol and potassium iodide are combined in an aqueous reaction medium to form a suspension agent system in a process for the bead suspension polymerization of styrene and butadiene to form poly(styrene-butadiene), styrene to form polystyrene, butadiene to form polybutadiene, styrene and isoprene to form poly(styrene-isoprene), styrene and acrylate to form poly(styrene-acrylate), and combinations thereof, including copolymers and terpolymers.

The process of the instant invention may be further facilitated, that is the suspension agent may be dispersed more readily thereby providing a more efficient suspension agent system, by the optional use of small amounts of surface active agents including nonionic, cationic, anionic or zwitterionic types, or mixtures thereof. A particularly useful surfactant in the instant invention is ALKANOL XC ™ a sulfonated naphthalate available from E. I. DuPont Chemical Company.

In embodiments, there can be incorporated into the monomer a waxy component, such as alkylenes, like polyethylene, polypropylene waxes, and mixtures thereof having a low molecular weight of from between about 1,000 to about 20,000. The use of such a component may be desirable for certain toner applications. Suitable low molecular weight waxes are disclosed in U.S. Pat. No. 4,659,641, the disclosure of which is totally incorporated herein by reference.

Toner compositions can be prepared by a number of known methods, such as admixing and heating resin bead particles obtained with the processes of the instant invention such as styrene butadiene copolymers, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 8 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner resins selected for the toner and developer compositions of the present invention include polyamides, styrene acrylates, styrene methacrylates, styrene butadienes, polyolefins, epoxies, polyurethanes, vinyl resins, including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl proprionate, and vinyl butyrate; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Specific toner resins include styrene butadiene copolymers, mixtures thereof, and the like.

As one toner resin, there can be selected the esterification products of a dicarboxylic acid and a diol comprising a diphenol. These resins are illustrated in U.S. Pat. No. 3,590,000, the disclosure of which is totally incorporated herein by reference. Other preferred toner resins include styrene/methacrylate copolymers, and styrene/butadiene copolymers; PLIOLITES ®; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof. Also, waxes with a molecular weight of from about 1,000 to about 6,000, such as polyethylene, polypropylene, and paraffin waxes, can be included in, or on the toner compositions as fuser roll release agents.

The resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330 ®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO.Fe_2O_3$) including those commercially available as Mapico Black, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK ®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL ®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL ®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15 ® commercially available from Eastman Chemical Products, Inc., VISCOL 550P ®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2.9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533, 4,937,166, and 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, and extrusion processing. Also, as indicated herein the toner composition without the charge enhancing additive can be prepared, followed by the addition of surface treated with charge additive colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resin beads of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples and comparative Examples are being supplied to further define various species of the present invention, it being noted that these Examples are intended to illustrate and not limit the scope of the present invention. Parts and percentages are by weight unless otherwise indicated.

EXAMPLE I

Free Radical Polymerization of Styrene and Butadiene with Alkali Salt Modified PVOH/PVOAc Suspension Agent System To 50 milligrams of poly(vinyl alcohol)-poly(vinyl acetate), PVOH/PVOAc stabilizer (88 percent hydrolyzed; molecular weight 96,000) in a modified Parr® reactor was added approximately 20 milliliters of deionized water. To this was added a solution of ALKANOL XC®, a sulfonated naphthalate, a wetting agent/surfactant, available from E. I. DuPont de Nemours & Company, and potassium iodide (28 milligrams, 0.16 millimols) in approximately 25 milliliters of deionized water. The total amount of deionized water in the reactor was adjusted to 100 milliliters. The reactor was sealed and heated to 95° C. A solution of styrene (71.3 grams, 0.69 mols), butadiene (10.7 grams, 0.20 mols), benzoyl peroxide (2.24 grams, 0.01 mols) and TAEC [O,O-t-amyl-O-(2-ethylhexyl) monoperoxycarbonate], available from Lucidol division of Pennwalt Corporation, (0.27 millilter) was added under 65 psi of nitrogen. The polymerization was allowed to continue for approximately 3 hours, vented five times to the atmosphere and then heated to 125° C., over 40 minutes, held at this temperature for 1 hour and then cooled to room temperature, about 25° C. The latter heating step is a finishing step for removing unreacted residual monomer, for example styrene, by continued polymerization. The bead size distribution ranged from approximately 50 microns to about 600 microns. The aqueous phase appeared only slightly turbid. The product was isolated by diluting the aqueous phase with about 1 liter of deionized water, and allowing the resin to settle and then decanting off the water. The remaining polymeric beads were taken up in 300 milliliters of deionized water and filtered. The product styrene-butadiene copolymer beads was dried at 45° C. under vacuum for 16 hours.

The resulting product was completely soluble in methylene chloride, toluene or tetrahydrofuran. The yield of the bead fines, that is polymer beads less than 100 microns in diameter obtained from evaporating to dryness a filtrate of a reaction product suspension that passed through a 100 micron pore size filter under vacuum filtration, were generally in the range of less than 0.25 weight percent of the total product. This amount may be compared with the fines, totaling from 2 to about 8 weight percent, obtained when the same reaction is performed in the absence of potassium iodide. The melt index was measured to be 24 grams/10 minutes and the glass transition temperature was 56° C. Molecular weights, $M_n$ and $M_w$, were found to be similar to a control sample, that is a styrene-butadiene copolymer as described in Example II having a $M_w=120,000$ to $130,000$, $M_n=20,000$, a glass transition temperature of about 56° C., and a melt index of about 21 to 24 grams/10 minutes. Comparison of the molecular weight distributions of the product with that of the control sample indicated they were nearly identical. The product was completely soluble in methylene chloride, THF or toluene. The ash content of the above prepared product resin beads of the present invention after combustion was 0.0005 percent by weight or 5 ppm of the resin beads.

EXAMPLE II

Comparative Free Radical Polymerization of Styrene and Butadiene in the Absence of an Alkali Metal Salt The reaction as recited in Example I was repeated except that the alkali metal salt potassium iodide was excluded from the reaction medium. The reaction polymer product was observed to have the following characteristics: the melt index was measured to be 22 grams/10 minutes and the glass transition temperature was 57° C. The yield of the fines was 7.3 percent by weight of the product which can be compared with the less than 0.25 percent obtained with the reaction with PVOH/PVOAc in combination with potassium iodide of Example I. In addition, this product of Example II contained a shell that was insoluble in THF or toluene comprising a crosslinked mixture of a styrene-butadiene and PVOH/PVOAc copolymers as characterized by infrared spectroscopy. The ash content of the product resin beads after combustion was zero percent by weight or essentially ash free, that is the presence of ash could not be detected using gravimetric techniques.

EXAMPLE III

The reaction as recited in Example I was repeated except that the alkali metal salt potassium iodide was replaced with sodium iodide (0.06 millimol). The reaction product was observed to have the following characteristics, the melt index was measured to be 22 grams/10 minutes and the glass transition temperature was 56° C. The yield of the fines was less than 0.25 percent by weight of the product. In addition, this product was soluble in methylene chloride, THF or toluene.

EXAMPLE IV

The reaction as recited in Example I was repeated except that the alkali metal salt potassium iodide was replaced with sodium iodide thiocyanate (0.15 millimol). The reaction product was observed to have the following characteristics: the yield of the fines was very large making the filtration step very slow and impractical for larger scale production processes. In addition, the product resin beads contained a shell that was insoluble in methylene chloride, THF or toluene. These results suggested that potassium thiocyanate was an unacceptable modifier of the PVOH/PVOAc stabilizer.

EXAMPLE V

Magnetic Toner Preparation and Evaluation

Polymer resin (74 weight percent of the total mixture) beads obtained by the process of Example I or Example II may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox 5028® soft silicone roll fuser, operated at 3 inches per second, set at 250° F. (cold offset), 275° F. (approximate minimum fix temperature, without offset), 290° F. (best image fix), 300° F. (no offset), 325° F. (no offset) and 350° F. (no hot offset).

The minimum fix and hot offset temperatures (in °F.) of the bead suspension polymerization polymers as toners are expected to be equivalent to the control toner of Example II because of the similarity of bead polymer properties. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from the resin polymers of Example II. Typically greater than 95 percent of the toner image remains fixed to the copy sheet after removing a tape strip as determined by a densitometer, for example as was observed for toner compositions prepared from the bead copolymers derived from Example II.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; and there resulted images for toner compositions prepared from the bead copolymers derived from Examples I and II of excellent quality with no background deposits and of high resolution for an extended number of imaging cycles exceeding, it is believed, about 75,000 imaging cycles.

Other toner compositions may be readily prepared by conventional means from the bead copolymer resins of the present invention including colored toners, single component toners, multicomponent toners, toners containing special performance additives, and the like.

The aforementioned polymerization process may be applied to a wide range of organic monomers to provide novel toner resin materials with desirable electrophotographic properties.

Other modifications of the present invention may occur to those skilled in the art based upon a review of the present application and these modifications, including equivalents thereof, are intended to be included within the scope of the present invention.

What is claimed is:

1. A suspension polymerization process for the preparation of polymer beads, wherein the ash content thereof is from about 5 to about 100 parts per million, said process consisting essentially of:
    (a) providing a reaction medium of water suitable for conducting said polymerization;
    (b) adding a surfactant to said reaction medium;
    (c) forming a suspension agent system in said reaction medium by in situ interaction of (i) from 0.01 to 0.10 percent by weight of a suspending agent consisting of partially hydrolyzed polyvinyl acetate and polyvinyl alcohol and (ii) from 0.01 to 0.10 percent by weight of potassium iodide;
    (d) adding polymerizable butadiene and styrene monomer compound to the resulting reaction medium having said suspension agent system dispersed therein;
    (e) effecting polymerization of said monomer in said reaction medium to form polymer beads having a size of from 200 to 600 microns and prevent the formation of a crosslinked insoluble shell on the surface of said beads thereby minimizing fine particle formation; and
    (f) washing and drying to isolate said polymer beads.

2. The process of claim 1 wherein said surfactant is a sulfonated naphthalate derivative.

3. The process of claim 1 wherein said reaction medium is maintained at 95° C. for about 3 hours followed by a finishing step at about 125° C. for about 1 hour to consume residual monomer.

4. The process of claim 1 wherein said reaction medium is deionized water.

5. The process of claim 1 wherein said potassium iodide comprises no more than 0.0005 parts by weight of said polymerizable monomer component.

6. The process in accordance with claim 1 further comprising adding at least one free radical initiator to said reaction medium selected from the group consisting of monoperoxy carbonates and peroxides.

7. The process in accordance with claim 1 wherein said low ash polymer beads possess a number average molecular weight of from about 10,000 to about 30,000 and a glass transition temperature of about 50° to about 65° C.

8. The process in accordance with claim 1 wherein said low ash resin polymer beads are comprised of a copolymer of poly(styrene-butadiene).

9. A suspension polymerization process for the preparation of polymer resin beads with substantially no ash content, which process consists essentially of providing a liquid reaction medium comprising water and surfactant, which medium is suitable for conducting polymerization; forming a suspension agent system in said reaction medium by the in situ interaction of a suspension component and an alkali metal halide wherein the suspension component is from 0.01 to 0.10 percent by weight of polyvinylalcohol/acetate and the alkali metal halide is from 0.01 to 0.10 percent by weight of potassium iodide; adding styrene monomer and a butadiene monomer to the reaction medium having said suspension agent system dispersed therein; effecting polymerization of said styrene monomer and said butadiene monomer in said reaction medium to form polymer beads having a size of from 200 to 600 microns; subsequently heating to consume any residual butadiene or styrene monomer and thereafter removing said reaction medium resulting in said polymer resin beads, and recovering polymer beads.

* * * * *